July 10, 1951     H. F. BENNETT     2,559,844
OPTICAL OBJECTIVE SYSTEMS COMPRISING A POSITIVE
MEMBER AND A NEGATIVE AUXILIARY MEMBER
Filed Jan. 21, 1949
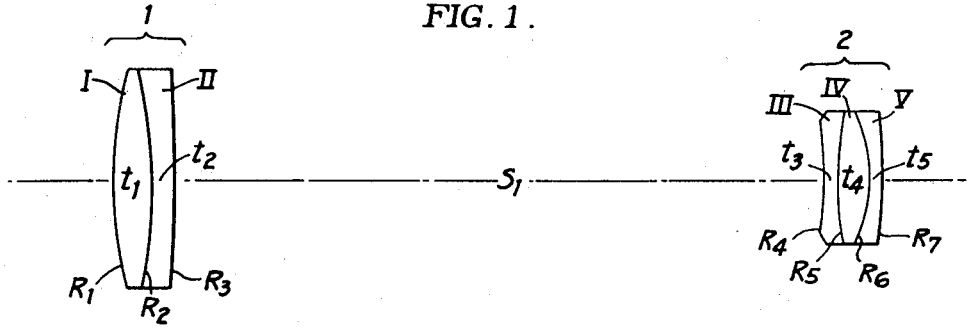
FIG. 1.
| EQUIVALENT FOCUS 100mm. | | | | f/11 |
|---|---|---|---|---|
| LENS | N | V | RADII | THICKNESSES |
| I | 1.5170 | 64.5 | $R_1$ = +19.80 mm. | $t_1$ = 1.84 mm. |
| II | 1.6170 | 36.6 | $R_2$ = −22.00 | $t_2$ = 1.05 |
|  |  |  | $R_3$ = −557.65 | $S_1$ = 30.40 |
| III | 1.5080 | 75.2 | $R_4$ = −17.86 | $t_3$ = 0.53 |
| IV | 1.5142 | 40.1 | $R_5$ = +14.49 | $t_4$ = 1.50 |
| V | 1.7551 | 47.2 | $R_6$ = −7.00 | $t_5$ = 0.53 |
|  |  |  | $R_7$ = −62.47 | BF = 23.93 |
FIG. 2.
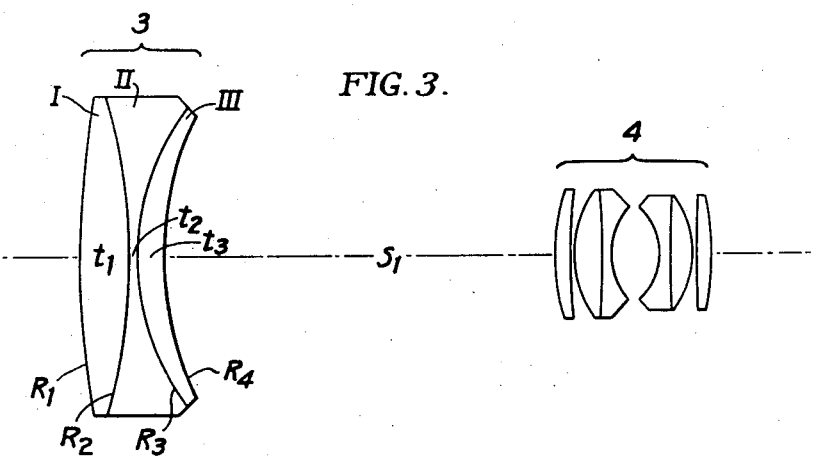
FIG. 3.
HAROLD F. BENNETT
INVENTOR
Daniel J Mapee
BY F M Emerson Holmes
ATTORNEYS Patented July 10, 1951

2,559,844

UNITED STATES PATENT OFFICE 2,559,844

OPTICAL OBJECTIVE SYSTEM COMPRISING A POSITIVE MEMBER AND A NEGATIVE AUXILIARY MEMBER

Harold F. Bennett, Rochester, N. Y., assignor to Eastman Kodak Company, Rochester, N. Y., a corporation of New Jersey Application January 21, 1949, Serial No. 71,965

8 Claims. (Cl. 88—57)

1

This invention relates to optical systems comprising a positive member and a negative auxiliary member axially aligned therewith and spaced therefrom. The negative member may be either in front of or behind the positive member.

The object of the invention is to reduce or eliminate the undesirable negative Petzval sum which has heretofore been common in such systems, and thereby to improve the correction of astigmatism.

Systems comprising a positive member and a negative member spaced therefrom are well known and include telephoto lenses, reversed telephoto or wide angle lenses, Galilean telescopes, afocal telephoto attachments, afocal wide angle attachments, and convertible systems made up of a standard photographic objective and a negative attachment which in some cases is behind the standard lens to make a telephoto system and in other cases is in front of the standard lens to increase the angular field.

According to the present invention, a corrected optical system includes a positive member and a negative auxiliary member axially aligned therewith and optically spaced therefrom by more than $0.2F_1$ and less than $2F_1$ where $F_1$ is the focal length and $1/F_1$ is the power of the positive member, in which the auxiliary member has a total thickness less than $0.5F_1$, has at least two lens elements, and has a power between $-0.16/F$, and $-5/F_1$, characterized in that the auxiliary member includes two adjacent lens elements differing in a refractive index by more than 0.10 and less than 0.60, the two adjacent surfaces of which differ in curvature by less than 30% and have a combined power between $-0.1/F_1$ and $-3/F_1$, said combined power also being numerically greater than the sum of the powers of the remaining surfaces of said auxiliary member.

The correction of color, spherical aberration, coma, and curvature of field, is accomplished by the usual methods of lens designing. To correct these aberrations the positive member should include at least one element of each sign, and in some forms of the invention may consist entirely of a biconvex element cemented to a negative element having a refractive index greater than that of the biconvex element and a dispersive index less than six-tenths that of the biconvex element.

In order to give the benefits of the invention, the pair of interior surfaces in the negative member should have a negative power greater than about one-tenth that of the positive member, and this power may be as much as three times as great. In order to have a pair of interior surfaces which have this much negative power without being too strongly curved to be manufactured conveniently, the refractive indices of the media on the two sides of said pair of surfaces should differ by at least 0.10. This difference in refractive index may be as great as available materials permit, which is about 0.60, since glasses known at the present time range from about 1.4 to about 2.0 in index. It is usually preferable to cement the pair of interior surfaces together into one cemented surface, but there are conditions of use in which it is preferable to have them air-spaced for practical reasons. A pair of facing surfaces differing little or none in curvature is considered as substantially equivalent in optical effect to a cemented surface. This equivalence is widely recognized, but for the purposes of the present invention it is preferred that the curvatures of the two surfaces differ by less than 30% of the stronger curvature and that the two surfaces be spaced apart by less than $1/20$ the focal length of the positive member. Obviously, additional elements may be used, for example, for the purpose of correcting the chromatic aberration.

The strongly negative Petzval sum common in optical systems of the kinds above described is improved by putting more of the negative power in a cemented surface or a pair of surfaces and less in the outer surfaces of the negative member in accordance with the invention. It will be recalled from standard optical textbooks that the Petzval contribution of a surface is its power divided by the product of the refractive indices of the two media which it bounds, and so the advantage of the cemented surface or equivalent pair is obvious. In order to gain a satisfactory degree of improvement, the power of the said pair of interior surfaces should be numerically greater than the sum of the powers of the remaining surfaces in the negative member. The invention is most useful in systems in which the product of the Petzval sum of the system times the focal length of the positive member in algebraically less than $+0.10$ when the invention is embodied in the system. It is noted that this product may be zero or negative.

For practical reasons, the radii of curvature of the pair of interior surfaces should be greater than $0.1F_1$, and an upper limit of about $6F_1$ is directly derived from the limitations on power and refractive indices already described. In fact this practical lower limit applies generally to all the surfaces in the system. In photographic objectives the said interior surfaces are preferably concave toward the positive member.

Strong telephoto lenses, i. e. those in which the negative member has a power numerically greater than that of the positive member and up to five or more times as great, have heretofore had a persistently negative Petzval sum which has made it impossible to simultaneously correct the curvature of field and astigmatism. The curvature of field has heretofore been corrected by a strong concave glass-air surface in the negative member, and the two members are usually optically spaced apart by between $0.2F_1$ and $0.8F_1$.

I have discovered that a strong telephoto objective can be designed in which at least half the power of the negative member lies in a pair of interior surfaces as above described, preferably cemented together, and that by this arrangement the undesirable negative Petzval sum is greatly reduced or completely eliminated, resulting in a great reduction in astigmatism.

Galilean telescope systems resemble strong telephoto objectives, the chief difference being that the spacing is such as to make the system afocal. Also the pupil or diaphragm is located behind the negative member rather than between the members as is usual in the case of telephoto objectives. In carrying out the known principles of good lens designing, this different pupil position leads to a somewhat different shape of the negative member—generally biconcave rather than meniscus—but the basic difficulty as to the negative Petzval sum is the same in both kinds of systems, since the powers of the negative members lie in roughly the same range, and accordingly the advantages of the invention are the same in both instances.

Galilean systems designed to be mounted in front of ordinary photographic objectives are known as telephoto attachments if mounted normally and as wide angle attachments if mounted in reversed position. The same improvement in Petzval sum is gained in this case also by putting more than half the power of the negative member into a pair of interior surfaces according to the invention.

Another type of system which has an undesirable negative Petzval sum is the convertible system made up of a standard photographic objective which can be used alone and a negative auxiliary member or attachment which in some cases is mounted behind the objective to form a telephoto system and in other cases is mounted in front of the objective to form a wide angle system. Even though the power of the negative member may be as little as one-fifth that of the standard objective, which in this case is the positive member of the system as above described, its negative Petzval contribution is undesirable because the standard objective usually has a substantially zero Petzval sum in contrast to the large positive Petzval sum of the positive member of the ordinary telephoto lens. This difficulty is largely responsible for the discontinuance of these convertible systems on the market.

Negative attachments are preferably concave toward the positive member and meniscus or plano-concave in shape. Telephoto attachments are mounted behind the positive member and preferably optically spaced therefrom by from $0.2F_1$ to $0.8F_1$ where $F_1$ is, as previously defined, the focal length of the positive member. Wide angle attachments are mounted in front of the positive member, preferably have a power numerically less than that of the positive member, and are preferably spaced therefrom by from $0.5F_1$ to $2F_1$, but may be mounted closer or even farther away than this. When mounted with its rear principal point at the front principal focus of the positive member or closer thereto, the negative auxiliary member does not actually increase the angular field covered on the same film area, but is useful in some cameras for increasing the back focal length to gain shutter clearance. When mounted beyond this point, the equivalent focal length of the system is less than that of the positive member, and so a wider angle is imaged on the film.

Afocal wide angle attachments have the advantage of decreasing the equivalent focal length without increasing the back focal length, and so are preferred for cameras having a substantially fixed distance between the standard lens and the film plane.

In the accompanying drawing:

Figs. 1 and 2 show a telephoto objective according to the invention and constructional specifications therefor.

Fig. 3 shows a wide angle objective system according to the invention.

The data given in Fig. 2 is repeated here for convenience:

*Example 1, Figs. 1 and 2*

F = 100 mm.    f/11

| Lens | N | V | Radii | Thicknesses |
| --- | --- | --- | --- | --- |
| I | 1.5170 | 64.5 | $R_1 = +$ 19.80 mm. | $t_1 = $ 1.84 mm. |
| II | 1.6170 | 36.6 | $R_2 = -$ 22.00 | $t_2 = $ 1.05 |
|  |  |  | $R_3 = -$ 557.6 | $s_1 = $ 30.40 |
| III | 1.5080 | 75.2 | $R_4 = -$ 17.86 | $t_3 = $ 0.53 |
| IV | 1.5142 | 40.1 | $R_5 = +$ 14.49 | $t_4 = $ 1.50 |
| V | 1.7551 | 47.2 | $R_6 = -$ 7.00 | $t_5 = $ 0.53 |
|  |  |  | $R_7 = -$ 62.47 | BF = 23.93 |

In this table and in the tables below the lens elements are numbered in the first column from front to rear, the corresponding refractive indices N for the D line of the spectrum and the dispersive indices V are given in the next two columns, and in the last two columns are given the radii of curvature R of the surfaces, the thicknesses $t$ of the lens elements, and the spaces $s$ between components, each numbered by subscripts from front to rear. The + and − values of R indicate surfaces respectively convex and concave toward the front.

Elements I and II are made of standard glasses now on the market. Element III is made of a glass described as Example V-3 in a copending application, Serial No. 644,178 by Sun and Huggins, now Patent No. 2,481,700, issued September 13, 1949. Element IV is made of a glass described as Example 3 in U. S. Patent 2,430,539 to Sun. Element V is made of a borate glass now in regular production by the Eastman Kodak Company.

In this example the positive member 1 and the negative member 2 make up a telephoto objective according to the invention. The positive member has a focal length $F_1$ of 44 mm. and a power of .023 and is substantially the same as the prior art. It consists of a biconvex element I cemented to the front of a negative element II, the refractive index of the latter being greater than that of the biconvex element by 0.10.

The negative member 2 with which the invention is principally concerned has a focal length $F_2$ of −19.6 mm. and a power of −.051 or −2.2 times the power of the positive member. The index difference at the cemented surface $R_6$ is 0.2409, and its power is −0.034 or −1.5 times the power of the positive member. The sum of the powers of the remaining surfaces $R_4$, $R_5$, and $R_7$ is $-0.016$, less than half that of the cemented surface $R_6$. Element III is included for the purpose of achromatizing the objective, and has a dispersive index greater than 1.4 times that of the positive element IV.

For the purposes of comparison to show the advantages of the invention, data is given in the following table for a telephoto lens according to the prior art consisting of two doublets, and since comparatively small changes in the spacing and powers of the two components may make a noticeable difference in Petzval sum, these characteristics have been made to agree rather closely to give a direct comparison.

*Prior art*

EF = 100 mm.   f/11

| Lens | N | V | Radii | Thicknesses |
|---|---|---|---|---|
| I | 1.5170 | 64.5 | $R_1=+$ 19.76 mm. | $t_1=$ 1.84 mm. |
| II | 1.6170 | 36.6 | $R_2=-$ 22.64 | $t_2=$ 1.05 |
|  |  |  | $R_3=-$ 627.3 | $s_1=$ 30.78 |
| III | 1.6109 | 57.2 | $R_4=-$ 10.45 | $t_3=$ 0.53 |
| IV | 1.6050 | 38.0 | $R_5=+$ 7.49 | $t_4=$ 1.05 |
|  |  |  | $R_6=-$ 73.23 | BF = 24.25 |

This lens was intended to cover ±2° working at f/11, and when a sample was tested, it was found capable of covering a considerably wider angle, about ±40.

The comparative state of correction of the two objectives is set forth as follows:

|  | Prior Art | Example 1 |
|---|---|---|
| Total length mm | 59.5 | 59.8 |
| Spherical aberration | $-0.012$ | $-0.009$ |
| Sine condition | $+0.011$ | $+0.067$ |
| Petzval sum | $-0.0154$ | $-0.0087$ |
| Field angle computed degrees | 1.91 | 2.0 |
| Distortion mm | $+0.010$ | $+0.014$ |
| Tangential curvature | $-0.050$ | $+0.023$ |
| Sagittal curvature | $+0.042$ | $-0.003$ |
| Astigmatism | $-0.092$ | $+0.026$ |

The distortion and field curvatures were computed for the F spectral line in the prior art example, and all the other values correspond to the D line. This difference, however, has a negligible effect as regards the comparison between the two objectives.

The great improvement in Petzval sum and astigmatism (i. e. the difference between the two curvatures) is clearly evident and represents a definite and fundamental gain which permits a still wider field to be covered than in the case of the prior art example.

The coma, as indicated by the sine condition, could be made smaller by known procedures of designing, but it is within acceptable tolerances for many uses.

Fig. 3 shows a wide-angle system according to the invention consisting of a negative cemented triplet 3 axially aligned with and spaced in front of a standard type objective 4. The constructional data for the negative member are given in the following table:

EF = $-410.6$

| Lens | N | V | Radii | Thicknesses |
|---|---|---|---|---|
| I | 1.7232 | 38.0 | $R_1=+$ 403.3 mm. | $t_1=$ 21.6 mm. |
| II | 1.6227 | 56.9 | $R_2=-$ 232.9 | $t_2=$ 2.8 |
| III | 1.4453 | 68.0 | $R_3=+$ 107.9 | $t_3=$ 11.4 |
|  |  |  | $R_4=+$ 141.4 | BF = $-397.8$ |

The three glasses used are listed as BaSF-8, SK-10, and FK-6 in the Schott catalog and the supplement thereto published during the war.

The power of the dispersive or negative cemented surface $R_3$ is $-.00164$, and the sum of the powers of the other surfaces $R_1$, $R_2$, $R_4$, of the negative member is $-.00092$, thus more than half the power of this member lies in the negative cemented surface, in accordance with the invention.

This negative attachment is designed for use with a positive member placed at such a distance that its entrance pupil is about 170 mm. from the concave surface $R_4$. The focal length of the positive member may conveniently be about 100 mm., in which case the power of the negative member is about $-0.24$ times that of the positive member.

This negative lens was designed for the same purpose as a known prior lens, that is it covers the same angular field, has the same magnification, and has very nearly the same distortion.

Computations give the following comparative data:

|  | Fig. 3 | Prior Art |
|---|---|---|
| Equivalent focal length mm | $-410.6$ | $-412.6$ |
| Back focal length | $-397.8$ | $-400.6$ |
| Paraxial magnification | 1.3838 | 1.3837 |
| Petzval sum | $-.00396$ | $-.00510$ |
| Field angle computed: |  |  |
| In object space degrees | 24.886 | 24.348 |
| In space between members do | 18.624 | 18.624 |
| Sagittal curvature mm | $+2.49$ | $-2.73$ |
| Tangential curvature | $-107.5$ | $-222.8$ |

It will be noted that the negative Petzval sum is greatly reduced and as a result the astigmatism is reduced by about half. This effect is gained almost entirely by putting more than half the power of the negative member in the cemented surface $R_3$.

It will be readily understood by skilled lens designers that this negative lens can be adapted for the requirements of other purposes by weakening the collective surface $R_2$. This would allow the distortion to be undercorrected but at the same time would greatly decrease the astigmatism which, in the use for which this example was intended, is balanced by opposite astigmatism in the positive member.

The following table gives data for a similar negative member designed for use as a wide angle attachment to be removably mounted in front of a corrected photographic objective in known manner in the position shown in Fig. 3. The three glasses used in this example are BaSF-8, SK-21, and FK-3 in the Schott catalog and supplement thereto.

| Lens | N | V | Radii | Thicknesses |
|---|---|---|---|---|
| I | 1.7232 | 38.0 | $R_1=+$ 352.2 mm. | $t_1=$ 18.2 mm. |
| II | 1.6582 | 57.1 | $R_2=-$ 352.2 | $t_2=$ 2.8 |
| III | 1.4644 | 65.7 | $R_3=+$ 107.9 | $t_3=$ 11.4 |
|  |  |  | $R_4=+$ 155.1 |  |

This negative member has the same paraxial magnification as the previous example. The distortion is undercorrected in the classical sense, but not objectionably so, and the Petzval sum is only $-.0021$. An angle of 25.434° in the object space corresponds to an angle of 18.624° in the space between the members, and, as computed for the ray at this angle, the sagittal curvature is $+18.1$ mm. and the tangential curvature is $-5.8$ mm. This is substantially a flat field and small enough astigmatism so that the over-all correction is satisfactory when mounted as a negative attachment in front of any corrected photographic objective such as, for example, those shown in U. S. Patents 1,786,916 and 2,262,985 and many others.

This invention is similar to that described in a copending application, Serial No. 71,964, filed concurrently herewith by myself and Rudolf Kingslake, and makes use of some of the same optical principles.

I claim:

1. An optical system comprising a positive member and a negative auxiliary member axially aligned therewith and optically spaced therefrom by more than $0.2F_1$ and less than $2F_1$ where $F_1$ is the focal length and $1/F_1$ the power of the positive member, in which each member includes at least one lens element of each sign, in which the Petzval sum of the system is algebraically less than $+0.1/F_1$, and in which the auxiliary member has a total thickness less than $0.5F_1$ and has a power between $-0.16/F_1$ and $-5/F_1$, characterized in that the auxiliary member includes two adjacent lens elements differing in refractive index by more than 0.10 and less than 0.60, the two adjacent surfaces of which differ in curvature by less than 30% and have a combined power between $-0.1/F_1$ and $-3/F_1$, said combined power also being numerically greater than the sum of the powers of the remaining surfaces of the auxiliary member.

2. An optical system according to claim 1 in which the said two adjacent surfaces have the same curvature and are cemented together.

3. An optical system according to claim 2 in which the auxiliary member consists of three lens elements cemented together, the signs of the outer two being opposite to that of the center one, and in which the said two adjacent surfaces are concave toward the positive member.

4. A telephoto objective comprising a positive member and a negative member axially aligned therebehind and optically spaced therefrom by more than $0.2 F_1$ and less than $0.8 F_1$ where $F_1$ the focal length and $1/F_1$ is the power of the positive member, in which the positive member includes a biconvex lens element cemented to a negative element having a higher refractive index and a lower reciprocal dispersive index than that of the biconvex element, in which the negative member has a total thickness less than $0.5F_1$, has at least one lens element of each sign, and has a power between $-1/F_1$ and $-5/F_1$, and in which the Petzval sum of the objective is algebraically less than $+0.1/F_1$, characterized in that the negative member includes two adjacent lens elements differing in refractive index by more than 0.10 and less than 0.60, the two adjacent surfaces of which differ in curvature by less than 30% and have a combined power between $-0.50/F_1$ and $-3.0/F_1$, said combined power also being numerically greater than the sum of the powers of the remaining surfaces of the negative member.

5. A telephoto objective according to claim 4 in which the said two adjacent surfaces have the same curvature and are cemented together.

6. A telephoto objective according to claim 5 in which the auxiliary member consists of three lens elements cemented together, the signs of the outer two being opposite to that of the center one, and in which the said two adjacent surfaces are concave toward the positive member.

7. A wide angle objective system comprising a positive member and a negative auxiliary member axially aligned in front thereof and optically spaced therefrom by more than $0.5F_1$ and less than $2F_1$ where $F_1$ is the focal length and $1/F_1$ is the power of the positive member, in which the positive member is a standard type photographic objective and in which the auxiliary member has an axial thickness less than $0.5F_1$, has at least one lens element of each sign, and has a power between $-0.16/F_1$ and $-1/F_1$, characterized in that the auxiliary member includes two adjacent lens elements differing in refractive index by more than 0.10 and less than 0.60, the two adjacent surfaces of which differ in curvature by less than 30% and have a combined power between $-0.1/F_1$ and $-3/F_1$ and numerically greater than the sum of the powers of the remaining surfaces of the auxiliary member.

8. An objective system according to claim 7 in which the said two adjacent surfaces have the same curvature, are cemented together, and are concave toward the positive member.

HAROLD F. BENNETT.

REFERENCES CITED

The following references are of record in the file of this patent:

UNITED STATES PATENTS

| Number | Name | Date |
|---|---|---|
| 538,182 | Rudolph | Apr. 23, 1895 |
| 943,105 | Wandersleb | Dec. 14, 1904 |
| 1,073,950 | Bielicke | Sept. 23, 1913 |
| 1,479,251 | Repp | Jan. 1, 1924 |
| 1,484,853 | Warmisham | Feb. 26, 1924 |
| 1,955,590 | Lee | Apr. 17, 1934 |
| 2,321,973 | Bennett | June 15, 1943 |

Certificate of Correction

July 10, 1951

Patent No. 2,559,844

HAROLD F. BENNETT

It is hereby certified that error appears in the printed specification of the above numbered patent requiring correction as follows:

Column 2, line 44, for "member in" read *member is*; column 5, line 32, for "±40" read *±4°*;

and that the said Letters Patent should be read as corrected above, so that the same may conform to the record of the case in the Patent Office.

Signed and sealed this 18th day of September, A. D. 1951.

[SEAL]

THOMAS F. MURPHY,
*Assistant Commissioner of Patents.*